United States Patent [19]
Douglas et al.

[11] Patent Number: 6,049,745
[45] Date of Patent: Apr. 11, 2000

[54] NAVIGATION SYSTEM FOR AUTOMATIC GUIDED VEHICLE

[75] Inventors: Barry D. Douglas, Doylestown; Joseph A. Bencel, Quakertown, both of Pa.

[73] Assignee: FMC Corporation, Chicago, Ill.

[21] Appl. No.: 08/795,267

[22] Filed: Feb. 10, 1997

[51] Int. Cl.[7] .................................................. G06F 165/00
[52] U.S. Cl. ............................ 701/23; 318/587; 180/168
[58] Field of Search ....................... 701/23, 24; 318/587; 180/167, 168, 169

[56] References Cited

U.S. PATENT DOCUMENTS

| | | | |
|---|---|---|---|
| 4,284,160 | 8/1981 | Deliban et al. | 180/168 |
| 4,361,202 | 11/1982 | Minovitch | 180/168 |
| 4,530,056 | 7/1985 | MacKinnon et al. | 364/424 |
| 4,716,530 | 12/1987 | Ogawa et al. | 364/424 |
| 4,780,817 | 10/1988 | Lofgren | 364/424.01 |
| 4,791,570 | 12/1988 | Sherman et al. | 364/436 |
| 4,990,841 | 2/1991 | Elder | 318/587 |
| 5,163,001 | 11/1992 | Luke, Jr. | 364/424.02 |
| 5,187,664 | 2/1993 | Yardley et al. | 364/424.02 |
| 5,267,173 | 11/1993 | Tanizawa et al. | 364/478 |

*Primary Examiner*—Michael J. Zanelli
*Attorney, Agent, or Firm*—Pauley Petersen Kinne & Fejer

[57] ABSTRACT

A method and system for navigating automatic guided vehicles (AGVs) through a workplace having intelligible areas provides multi-vehicle traffic control. A guidance apparatus conveys a plurality of guidance signals, and a plurality of radio frequency tags (RF tags) are provided along the path over which the vehicle travels. Each RF tag is capable of conveying at least one of a plurality of unique radio frequency signals in response to electromagnetic excitation fields. A controller mounts on the vehicles, and includes an AGV computer, a sensor, a radio frequency identification (RFID) reader, and an RF modem for broadcasting messages to other vehicles to facilitate multi-vehicle traffic control. RF tags positioned for identifying characteristic area conditions related to the path of the vehicle reduce the need for custom modifications to guidance software on the host or AGV computers when operating in new environments, e.g., a new factory floor layout. The controller is responsive to at least one of the plurality of guidance signals received by the sensor and at least one characteristic area condition identified by the RF tag reader coupled to the AGV computer for initiating a predetermined action for navigating the vehicle through the area.

22 Claims, 4 Drawing Sheets

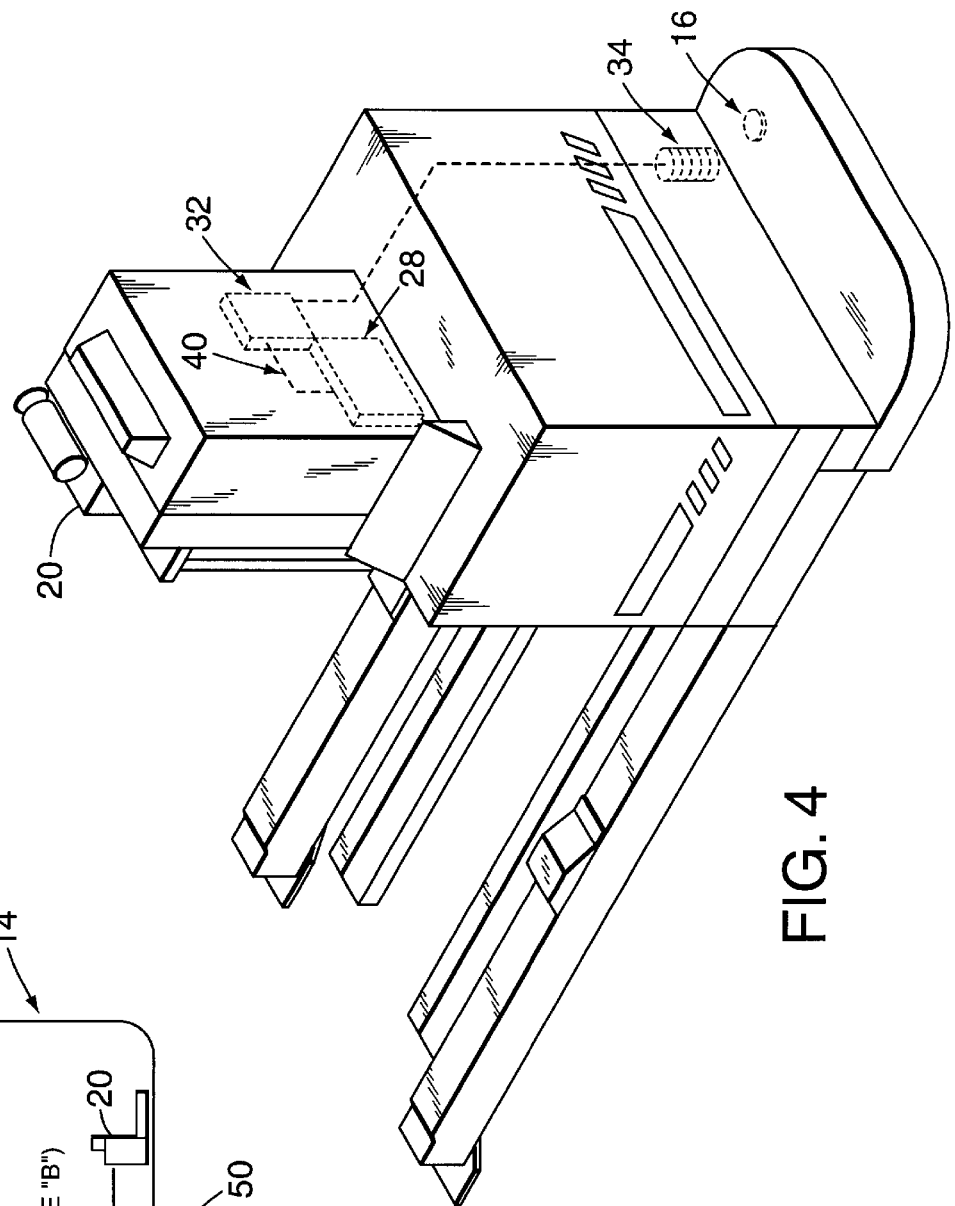
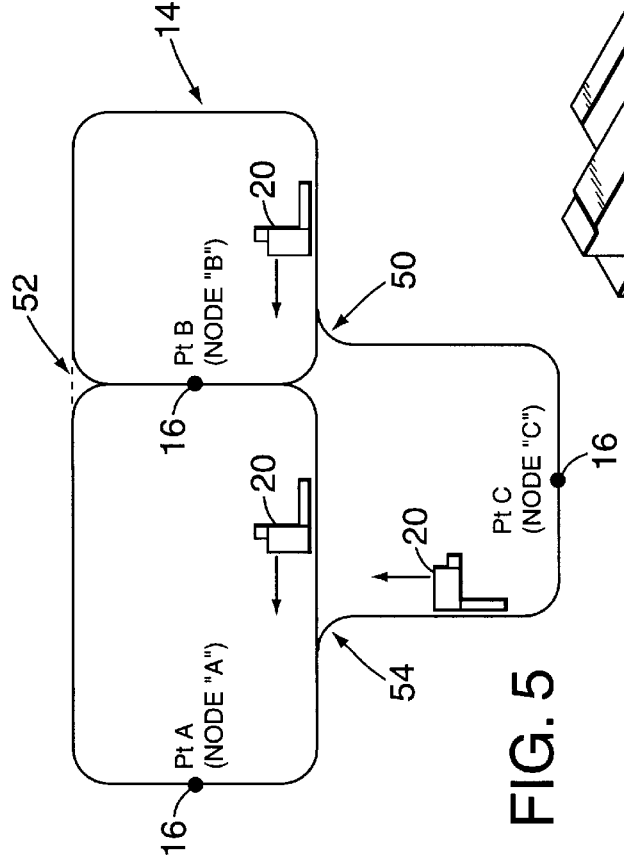
FIG. 4
FIG. 5

NAVIGATION SYSTEM FOR AUTOMATIC GUIDED VEHICLE

BACKGROUND OF THE INVENTION

The invention relates in general to automatic guided vehicles (AGVs) and, in particular, to methods and systems for navigating automatic guided vehicles through congested factory floors having intelligible areas for providing navigating information to the vehicles.

Presently, wire guidance systems and the like are widely used in which automatic guided vehicles are provided with sensors allowing the vehicles to accurately follow a path, e.g., wires embedded in the factory floor. These embedded wires are put in the floor such that they connect locations that the automatic guided vehicles will travel to and from. Such wire guidance systems typically provide as many as four different frequencies that sensors on the vehicle can detect to guide upon. In this manner complex patterns can be created which allow the vehicles to move in areas of high congestion. This type of guidance technology is very common and is used by a variety of vendors worldwide.

However, the wires buried in the floor do not indicate the location of individual automatic guided vehicles by themselves because the vehicle may be at any position along the wire. While bar coding, radio frequency identification (RFID) and other identification techniques have been used with automatic guided vehicles to identify their payloads or destinations, additional intelligence, i.e., information processing either centrally or on the vehicle, is required to direct the vehicles from one location to another and allow them to be tracked as they move so vehicle position, i.e., vehicle location, on the guidepath can be continually updated. For wire guidance technology, the vehicles must be able to select the proper guidance frequency as it moves, know when it is at its destination, and know when to hesitate to avoid other vehicles so collisions do not occur.

Typically the solution to this problem is provided by combining intelligence on the vehicles along with a central or host computer to control and monitor the vehicles. However, since many factories tend to be different in both physical layout and purpose, the guidepath that the vehicles follow may vary greatly. Therefore, this intelligence on the automatic guided vehicles' AGV computer and the central computer must be customized for each application or installation. Since the automatic guided vehicles are controlled by a computer, both the AGV computers and the central computer must have custom software written for each factory. It takes time to design, code and debug this software and it can be very expensive requiring substantial engineering man-hours to implement.

Automatic guided vehicles are usually dispatched to a location by one of three available options: (1) an individual physically retrieves a vehicle while it is circulating around a simple guide path "loop" which drastically limits the automatic guided vehicles capabilities and intended path of the automatic guided vehicle to simple movements; (2) the vehicle has an intended guide path and all possible routing information is stored on-board; or (3) an off-board, upper level control system routes a vehicle to a specific location.

If the proposed guide path of the automatic guided vehicle is complex, e.g., having multiple loops and intersections, then the vehicle must know when to turn, and how to turn for a given situation. All the required information needed to execute movement must be stored onboard the vehicle. Such information stored on the automatic guided vehicle would demand rather large and indefinate amounts of memory storage as the automated system expands. The stored information would be unique to that specific site installation. Costly additional programming would be required for each new installation. The complexity significantly increases when multiple automatic guided vehicle's are introduced into the system.

Alternatively, an off-board, upper level control system, commonly known as a "host," could generally be a programmable logic controller (PLC) or personal computer (PC) level of computer or higher. Movement commands from the host are relayed to the vehicle via an RF link or by other available means of communications. Hardware costs are added above and beyond the cost of the automatic guided vehicles. Again, information required to run the automated system would be unique to that specific site installation. Costly additional programming would be required for each new installation.

SUMMARY OF THE INVENTION

A navigation system and method embodying the present invention eliminates the requirement for custom software on the automatic guided vehicles as well as in the central computer. Instead, radio frequency (RF) tags are embedded next to the wire guidepath in strategic locations to provide intelligence to direct vehicles to their destinations. Thus, the floor becomes "smart" and as the vehicle travels along the guidepath it uses these RF tags as signposts to direct it to its destination. The described embodiment employs radio frequency identification (RFID) as a means of providing routing information to automatic guided vehicles to direct them to and from requested destinations in order to facilitate safe navigation through the workplace, in addition to identifying payloads or destinations. Thus high levels of control hardware or significant customization of control software typically used in such automated systems are not required. The RF tags of the described embodiment are nonpowered, passive transponders, presently used as devices for identification in industrial applications. Such tags may be quite small and are reliably embedded in concrete and operate reliably.

Each vehicle in the system is provided with an RF tag reader to read the RF tags. When the automatic guided vehicle passes over a tag its RF tag reader creates an electromagnetic field which excites the tag and the RF tag in the floor gives off a predetermined code which can be read by the vehicles computer. Software on the vehicle AGV computer recognizes the tag's code and responds, causing the vehicle to take appropriate action as indicated by the tag code and the internal vehicle states. Such predetermined actions may include turning to head in a different direction, selecting a different guidance frequency, or picking up or dropping off a load of materials being transported.

The tags buried in the floor contain information which causes them to act as routing tags indicating, e.g., which wire guidance frequency the vehicles should follow, the direction to the next destination, when the next intersection will be reached to allow the vehicle to safely navigate throughout the factory, etc. A series of different preprogrammed tags are thus provided which can be strategically positioned in the floor of a workplace to avoid the effort and expense of creating customized software. The method for installing this system allows a factory technician to read an installation manual which describes the RF tag system. The technician then places the tags in the floor according to a predetermined set of rules creating a pattern of tag points. Each of the tag points is uniquely distinguishable. An intelligible area is thereby provided which conveys navigating information to automatic guided vehicles.

Additional hardware is also provided on the automatic guided vehicles of the described embodiment. A low-cost RF modem (radio) allows the vehicle to communicate with the host computer, and directly with other vehicles in a limited fashion. The purpose of this modem is for a vehicle to broadcast to other vehicles that it is crossing a traffic intersection. Other vehicles approaching the same intersection would listen for this broadcast message upon arrival at the intersection. Once the vehicle in the intersection is clear it need no longer broadcast that it is in the intersection and therefore allows other vehicles to enter the intersection. In this manner, the vehicles would not run in to one another when they cross paths. As discussed, the RF tags embedded in the floor would tell the automatic guided vehicles where the intersections begin, end and individual identifications for each one so that they are all unique. The vehicles also are provided with collision avoidance sensors having ranging devices to prevent the vehicles from running into one another.

Accordingly, the workplace having intelligible areas facilitates multi-vehicle traffic control wherein automatic guided vehicles are provided with an RFID reader and an RF modem for broadcasting messages to other vehicles. RF tags positioned for identifying vehicle parameters or characteristic area conditions related to the path of the vehicle reduce the need for custom modifications to guidance software on the host or AGV computers when operating in new environments, e.g., a new factory floor layout. By way of its controller the vehicle is responsive to at least one of the plurality of guidance signals received by the sensor and at least one characteristic area condition identified by the RF tag reader coupled to the AGV computer.

The navigation systems and methods embodying the invention greatly simplify implementation of low end automatic guided vehicle systems. Less skilled technicians are able to install and expand the guidepath of the automatic guided vehicles with minimal training or skilled assistance. The overall costs of automatic guided vehicle systems are reduced, making the technology available to a broader market.

Briefly summarized, the present invention relates to navigating the automatic guided vehicles through congested areas. A guidance apparatus conveys a plurality of guidance signals, and a plurality of routing tags are provided along the path over which the vehicles travel. A controller is mounted on each of the vehicles for controlling vehicle operations. The controller includes a sensor for receiving the plurality of guidance signals and a routing tag reader coupled to an information processor. The routing tags are positionable along the path over which the vehicles travel, wherein each of the routing tags may be used for identifying a characteristic area condition related to the path of the vehicle. The controller is responsive to at least one of the plurality of guidance signals received by the sensor and at least one characteristic area condition identified by the routing tag reader coupled to the information processor for initiating a predetermined action for navigating the vehicle through the area.

It is an object of the present invention to provide navigation systems and methods for automatic guided vehicles that overcome the disadvantages and problems of the prior art.

It is another object of the invention to provide an intelligible area for providing navigating information to an automatic guided vehicle.

It is yet another object of the invention to provide a system and a method of navigating an automatic guided vehicle through a congested area.

Other objects and advantages of the present invention will become apparent to one of ordinary skill in the art, upon a perusal of the following specification and claims in light of the accompanying drawings.

BRIEF DESCRIPTION OF THE DRAWINGS

FIG. 4 shows an RFID tag reader and antenna combination of the controller mounted on the automatic guided vehicle; and FIG. 5 depicts a multi-loop AGV guide path in accordance with the invention.

DETAILED DESCRIPTION OF THE PREFERRED EMBODIMENT

Figure 1:
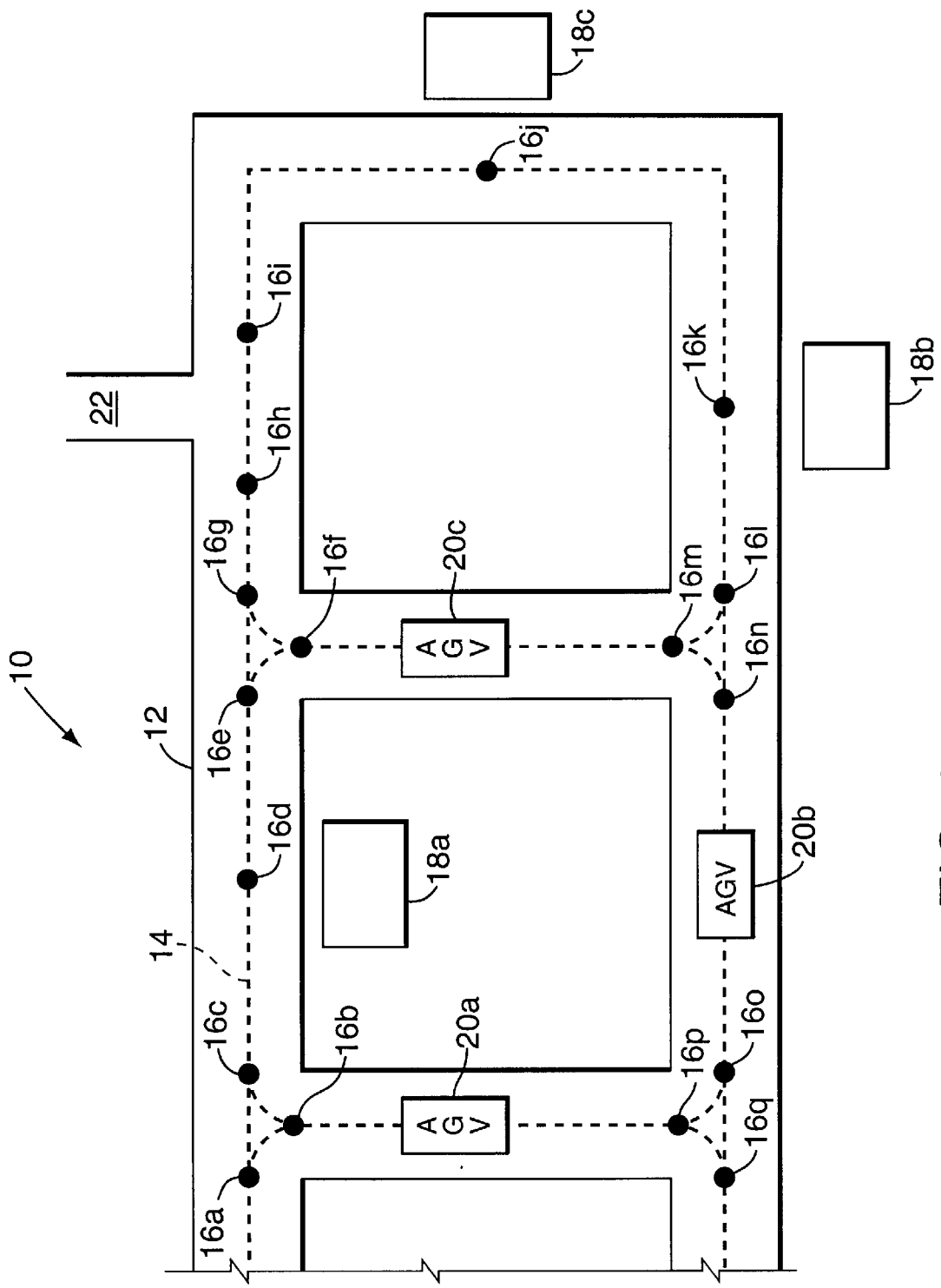
FIG. 1 shows a system embodying the present invention which provides navigating information to a plurality of automatic guided vehicles.
Figure 2:
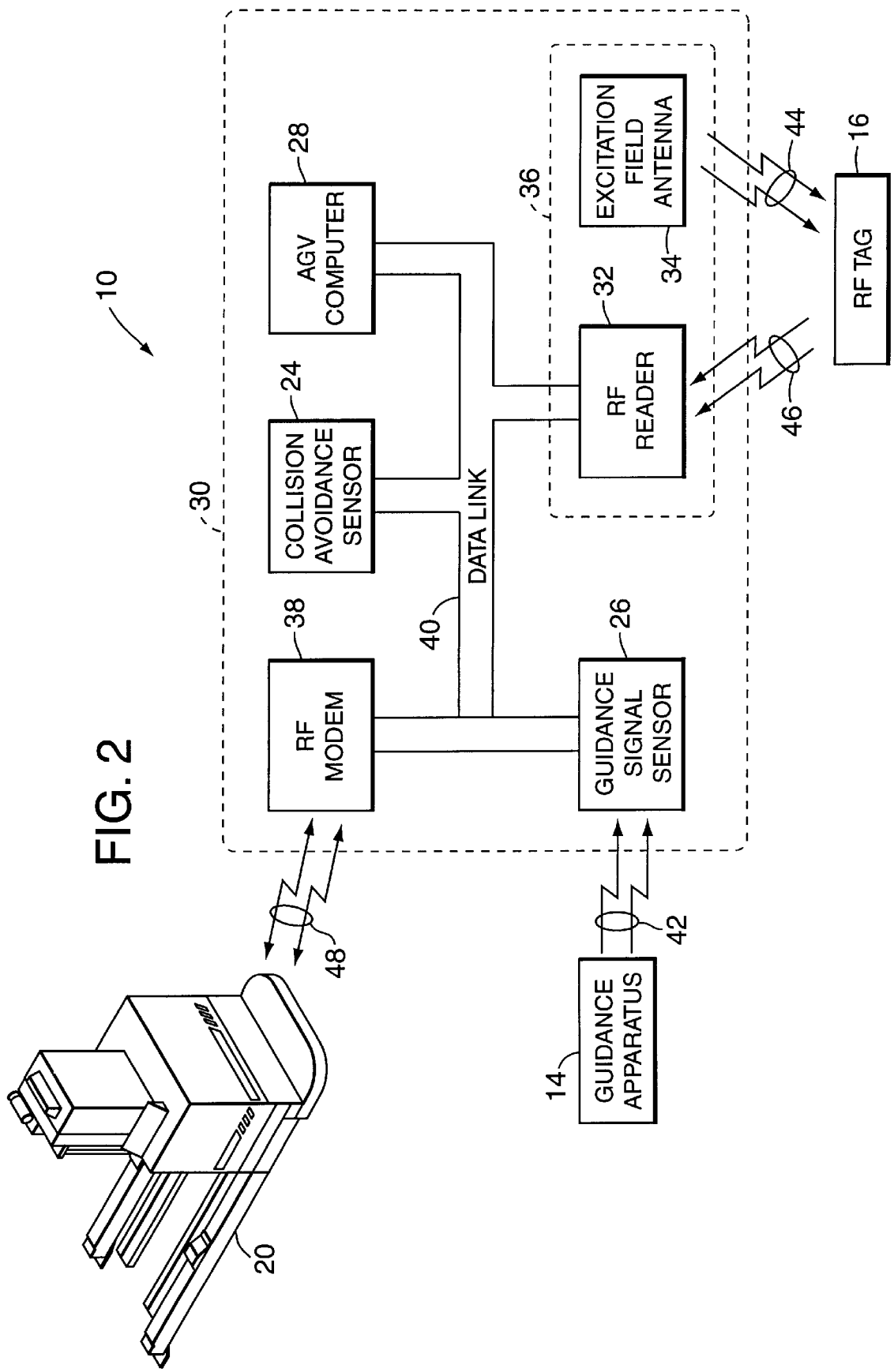
FIG. 2 is a block diagram of the system shown in FIG. 1.

Referring now the drawings and especially to FIGS. 1 and 2, a system for navigating an automatic guided vehicle embodying the present invention is generally shown therein and is identified by numeral 10. The system 10 includes an intelligible area 12 for providing navigating information to a plurality of automatic guided vehicles (AGVs) 20a–c. Herein the intelligible area 12 is depicted as a workplace, e.g., a congested factory floor. A guidance apparatus 14 is shown in dashed lines (FIG. 1) as a wire guidance system for conveying a plurality of guidance signals for guiding the vehicles 20a–c. The guidance apparatus 14 of the described embodiment is embedded under the factory floor along a path over which the vehicles 20a–c travel. Those skilled in the art will appreciate that the vehicles 20a–c of FIG. 1 may alternatively maneuver around their designated guidepaths by using several other methods. Other guidance methods in use today include inertial navigation using gyroscopes, laser triangulation, visual referencing and global position technology.

RF tags 16 capable of conveying at least one of a plurality of unique radio frequency signals are embedded in the area 12 in the vicinity of the path defined by the wire of the guidance apparatus 14. A plurality of RF tags 16a–q are responsive to electromagnetic excitation fields, and act as routing tags. Each of the RF tags 16a–q conveys at least one of a plurality of unique states sufficient in number to provide information for identifying a characteristic area condition related to the path of the vehicle. The described embodiment uses radio frequency identification (RFID), however, any information gathering systems such as a bar code reader/labels or coded magnets could also be implemented in this navigational design. The RFID unit, discussed below, was selected due to its compact size, environmental ruggedness, and cost.

The RF tags 16a–q are used at various points along the paths of the vehicles 20a–c which maneuver around factory floor of FIG. 1. Some of these RF tags, e.g., 16a–c are used to identify the characteristic area condition related to the path as an intersection being approached or cleared by the vehicle 20a to facilitate safe navigation through the intersection. RF tags 16h and 16j can require the vehicles 20 to sound an audible alarm or horn to warn people entering the area through a corridor 22. RF tags 16d, 16j, and 16k may indicate, e.g., various workstations 18a–c respectively, that may indicate decks, lifts, bays, conveyors and the like. Additionally, each of the RF tags 16a–q also provides a means for providing routing information to direct any of vehicles 20a–c to and from their requested destinations to facilitate safe navigation through the area 12, in addition to identifying any materials in transit.

FIG. 2 illustrates vehicle 20 and a block diagram of the system 10 for navigating the vehicles 20 via the wire guidance apparatus 14 using a guidance signal sensor 26 coupled to an AGV computer 28 with a bus or data link 40. The vehicle 20 is thus responsive to at least one of the plurality of guidance signals 42. The vehicle 20 communicates with, and receives commands issued from, a host computer (not shown) by way of an RF link 48, discussed below. The vehicles 20 also are provided with a collision avoidance sensor 24 having ranging devices to prevent the vehicles 20 from running into one another. Such ranging devices typically include infrared sensors and retro-reflective materials, e.g., tape, on the vehicles 20 for detection. Alternatively, devices employing ultrasound principles or microwave principles and like techniques for ranging the distance between the vehicles 20 to prevent collisions.

A vehicle controller 30 for mounting on the vehicle 20 controls the operation of the vehicle 20, and includes an information processor, i.e. AGV computer 28, and the sensor 26 coupled thereto. A radio frequency tag reader 32 receives the unique radio frequency signals 46 from the RF tag 16 in response to the electromagnetic excitation fields 44. An excitation field antenna 34 comprises an electromagnetic field emitter or generator positioned in the vicinity of each of RF tags 16 for generating excitation fields in the general vicinity of one or more of RF tags 16. The RF tag reader 32 of said controller and antenna 34 in combination act as the RFID unit 36 for identifying the characteristic area condition.

The controller 30 also includes a communications transceiver, herein a radio frequency modem 38 coupled to the AGV computer 28 for broadcasting messages to other vehicles 20 via a radio communications channel 48, as depicted in FIG. 2. This facilitates multi-vehicle traffic control responsive to the unique radio frequency signals from said radio frequency tags identifying at least one characteristic area condition related to the path being navigated through congested areas. The controller 30 for vehicle 20 is thus responsive to at least one of the plurality of guidance signals and at least one characteristic area condition for navigating the vehicle through the area, as well as radio communications from other vehicles 20.

Figure 3:
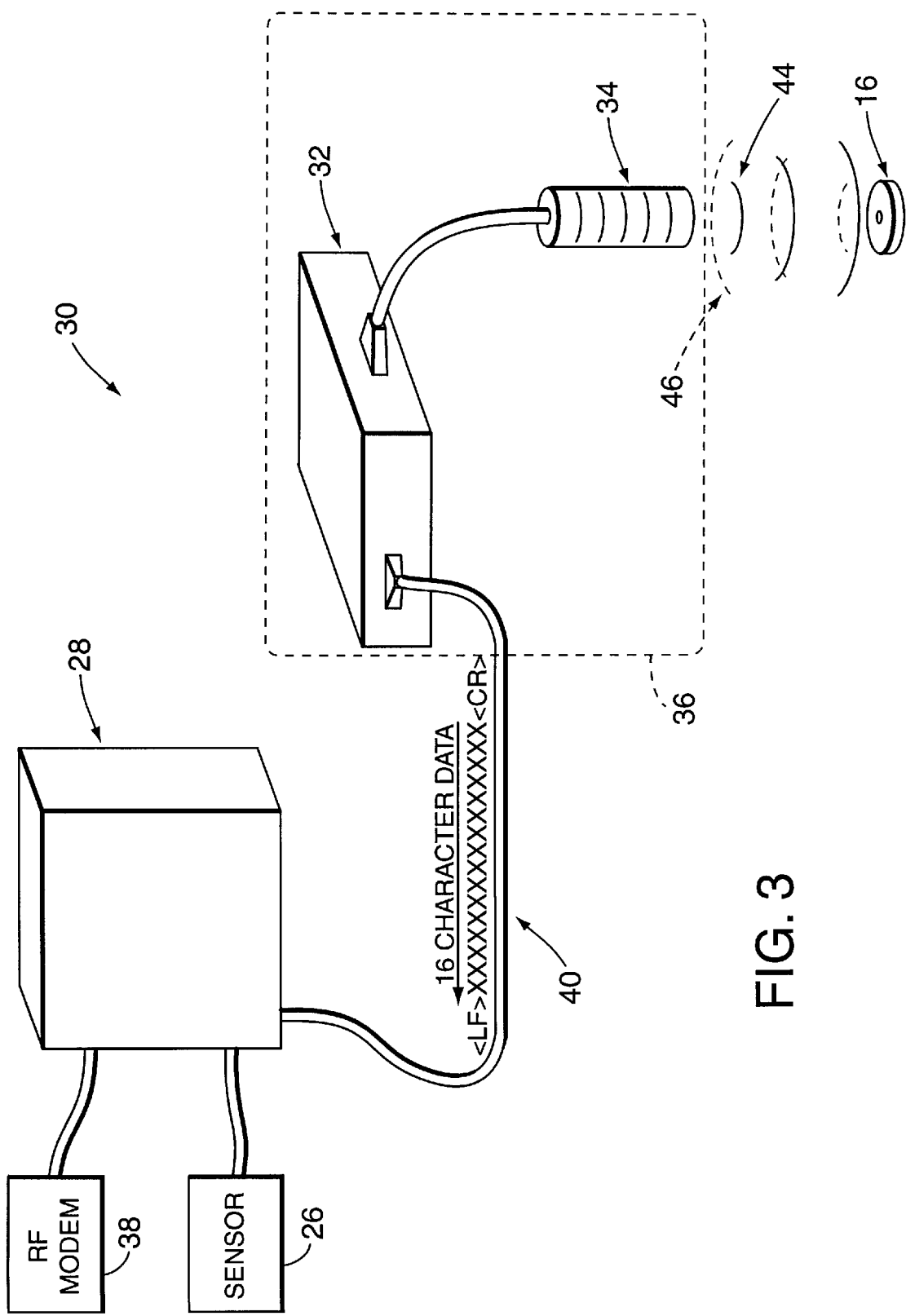
FIG. 3 shows a controller comprising a portion of the system shown in FIG. 2, the controller includes a guidance signal sensor, a collision avoidance sensor, a radio frequency modem, and a radio frequency tag reader with an excitation field antenna for radio frequency identification (ED) coupled to an AGV computer.

The particular RFID unit 36 selected for use is the TELSOR Model 4000 series, manufactured by TELSOR Corporation, Englewood, Colo. Another manufacturer of such units in the United States is Texas Instruments' Registration and Identification System, also known as TIRIS. The RFID unit 36 operates by the principals of mutual magnetic inductance. Both power and data are transmitted via low power RF electromagnetic fields. The RFID unit 36 typically includes a microprocessor based control board RF reader 32 interface and antenna 34, for operation with the RF tag 16 (FIG. 3). The RFID unit 36 components, RF tag reader 32 and antenna 34, and AGV computer 28 mount on the vehicle 20 and interface to its on-board controller as shown in FIG. 4.

The passive RF tag 16 is programmed with 16 characters of ASCII alphanumeric data. This programmed data may contain essential vehicle parameters and routing information. The data programmed into the tag is obtained when the RF tag 16 is excited by the 148 kHz electromagnetic field 44 emitted from the passing antenna 34 mounted on the vehicle 20. The RF tag 16 responds by transmitting its programmed data back via a digitally encoded 37 kHz signal 46. The encoded signal 46 is then received and processed for controlling the vehicle 20. Accordingly, the RF tags 16 convey unique signals 46 in a sufficient number of states or values to convey enough information to identify the characteristic area condition related to the path of the vehicle 20. The states or values of the unique signals 46 are in the form of a multi-bit signal and the RF tag reader 32 decodes this multi-bit signal using the AGV computer 28 to identify the characteristic area conditions. In the described embodiment such multi-bit states or values are provided in the form of American Standard Code for Information Interchange (ASCII) symbology.

Thus it is intended that individual vehicles 20, or groups of vehicles 20 equipped with AGV computer 28 processor-based controls are able to navigate throughout the automated system 10, and move point to point with or without the host computer. Where the host computer (not shown) is required, a simple PC, generic software package and a low cost RF modem can be used. By employing the use of low cost coded routing transponders, i.e., RF tag 16, a vehicle equipped with the RFID unit 36 navigates the guide path much as a person in an automobile navigating the highways does with a road map. The vehicle's AGV computer 28 on-board program would digest the routing tag's programmed information in order to obtain directional, speed, and other functional information. Once the on-board controls are programmed, future downloading to the AGV computer 28 is not required.

The system 10 is designed by identifying the intended path of the vehicles 20, i.e., pick-up and drop-off locations, points on the guidepath, also known as nodes, e.g., nodes at points A, B and C in FIG. 5, and intersections 50, 52 and 54 are also be identified. Once this is accomplished, and the navigational means of the guidance has been installed, i.e., floor cuts and wire installed for wire guidance, laser targets mounted for laser triangulation and so forth. Then the RF tags 16 are selected and installed. The RF tags 16 themselves can be extremely small (e.g., the size of a United States nickel coin) and can be reliably embedded in concrete, or mounted to a structure.

In accordance with the method for installing the system 10, a factory installer reads the installation manual that describes the RF tags 16. The installer would then mount the tags or drill holes in the floor according to a predetermined set of rules. These routing tags would contain information such as, but not limited to, the following:

GUIDANCE FREQUENCY
VEHICLE SPEED
START OF INTERSECTION
GO A PREDETERMINED DISTANCE
PICK-UP STATION
PAUSE OR WAIT
MODE LOCATION
TURN ON BEACON
GUIDANCE HEADING
RUN LIFT OR ROLLER DECK
END OF INTERSECTION
LOOK FOR AN EVENT

DROP-OFF STATION
SOUND ALARM OR HORN
COMMUNICATION (IF REQUIRED)
GO TO MAINTENANCE
EXIT INFORMATION

Since the selected tags can contain 16 characters of ASCII, and there are approximately 95 individual, usable ASCII characters, the amount of information available to the vehicle is extremely large. The data field of the tag is shown below.

TAG DATA POSITION:
<LF> 1 2 3 4 5 6 7 8 9 10 11 12 13 14 15 16 <CR>

Data position #1 could define guidance frequency to the vehicle. Data Position #2 could define guidance heading or direction, and so forth. The ASCII control characters, <LF> and <CR> are "framing" characters. These characters tell the vehicle controller the stop and start of the formatted information.

In the beginning of the day, the automatic guided vehicle system is turned on, or is already started. The vehicle will be started along the guidepath. The vehicle may have a given destination entered by an on-board keypad/display, or by an external signal. The destination may be a pick-up or drop-off location. If no destination is given, the vehicle will circulate through the guidepath. When the automatic guided vehicle 20 passes near the RF tag 16, its RFID unit 36 excites the tag 16 which then gives off its predetermined code for reading by the vehicle's controller. Software on the vehicles 20 are programmed to recognize the tag's code identifying vehicle location and allowing the vehicle 20 to take appropriate action as indicated by the tags code. If the vehicle 20 has a destination, the tag's data will contain information to enable the vehicle 20 to reach its destination. In a single automatic guided vehicle application, situated on a multi-loop guidepath, this tag data may contain "EXIT" information. As shown in FIG. 5, the multi-loop guidepath also contains the intersections 50, 52 and 54. The "EXIT" information contains destination numbers that are encompassed by a guidepath loop.

Thus, as the vehicle 20 is travelling and it comes upon a tag with "EXIT" information, the software will determine whether the vehicle needs to take some action for the contained "EXIT" information. If the answer is NO, then the vehicle does not take any action, i.e., does not change its heading. If the answer is YES, then the vehicle will take the action required and continues on. Like driving down a highway in an automobile with a road map, the vehicle 20 looks for the EXIT sign to get to its destination. When the vehicle finally arrives at the intended destination, which is determined by another routing tag, then the vehicle may pick-up or drop a load, or possibly receive maintenance.

If the automatic guided vehicle system 10 has multiple automatic guided vehicles 10, then additional hardware may be used on the automatic guided vehicles. This would include the low-cost RF modem 38 to allow the vehicles to communicate to one another in a limited fashion, and the collision avoidance sensor 24 discussed above. The purpose of this modem is to broadcast to other vehicles that it is crossing a traffic intersection. The control of guided vehicle traffic at an intersection will be defined by the RF tags 16 and the position of the other vehicles. Other vehicles approaching the same intersection wait to receive this broadcast message upon arrival at the intersection. If a vehicle is broadcasting that it has control of the intersection, then all other automatic guided vehicle approaching the same intersection will pause. Once the vehicle in the intersection is clear it no longer broadcasts that it is in the intersection and therefore allow other vehicles 20 to enter the intersection.

In this manner, the vehicles 20 will not collide when their paths intersect. If multiple vehicles 20 approach at the same exact time, contention for the intersection will be resolved in response to the lower vehicle ID number priority. Thus, the RF tags 16 identify the characteristic area condition related to the path as an intersection being approached or cleared by the vehicle 20, whereupon the RF modem 38 broadcasts its vehicle-crossing message to the other vehicles 20 indicating that the intersection is in use to facilitate safe navigation through the intersection.

The sole requirement of the automatic guided vehicle's on-board navigational software is the ability to accept a given destination and how to interpret the RFID tag data, and obtain status data from the vehicle, e.g., operating information, battery level, etc. To get from point "A" to point "B", to point "C", and so forth, does not require a change in software from installation to installation. If a host computer is required in the system, its software would simply communicate to the automatic guided vehicle, the destination requested by a person or piece of equipment.

While there has been illustrated and described a preferred embodiment of the present invention, it will be appreciated that numerous changes and modifications may occur to those skilled in the art, and it is intended in the appended claims to cover all those changes and modifications which fall within the true spirit and scope of the present invention.

What is claimed is:

1. A system for navigating an automatic guided vehicle through a congested area, comprising:

a guidance apparatus for conveying a plurality of guidance signals for guiding the vehicle, said guidance apparatus being positionable relative to the area along a path over which the vehicle travels;

a plurality of routing tags, each of said routing tags conveying at least one of a plurality of unique states sufficient in number to provide information for identifying a characteristic area condition related to the path of the vehicle;

a controller for mounting on the vehicle for controlling the operation of the vehicle, said controller comprising an information processor, and a communications transceiver coupled to said information processor for broadcasting a message to other vehicles in the area, said information processor broadcasting said message upon approaching an intersection, and no longer broadcasting said message after leaving the intersection;

said routing tags being positioned along the path over which the vehicle travels, said controller being responsive to at least one of the plurality of guidance signals and at least one characteristic area condition for navigating the vehicle through the area.

2. A system for navigating an automatic guided vehicle through a congested area, comprising:

a guidance apparatus for conveying a plurality of guidance signals for guiding the vehicle, said guidance apparatus being positionable relative to the area along a path over which the vehicle travels;

a plurality of radio frequency tags, each of said radio frequency tags conveying at least one of a plurality of unique radio frequency signals in response to electromagnetic excitation fields;

an electromagnetic field generator positionable in the vicinity of each of said radio frequency tags for generating electromagnetic excitation fields at one or more of said radio frequency tags;

a controller for mounting on the vehicle for controlling the operation of the vehicle, said controller comprising an information processor, a sensor coupled to said information processor for receiving the plurality of guidance signals via said guidance apparatus, a radio frequency tag reader coupled to information processor for receiving the unique radio frequency signals in response to the electromagnetic excitation fields, and a communications transceiver coupled to said information processor for broadcasting a message to other vehicles in the area, said information processor broadcasting said message upon approaching an intersection, and no longer broadcasting said message after leaving the intersection;

said radio frequency tags being positioned along the path over which the vehicle travels, each unique radio frequency signal of said radio frequency tags identifying a characteristic area condition related to the path of the vehicle; and said controller being responsive to at least one of the plurality of guidance signals received by said sensor and at least one characteristic area condition identified by said radio frequency tag reader coupled to said information processor for initiating a predetermined action for navigating the vehicle through the area.

3. A system as recited in claim 2, wherein the congested area is a factory floor and said guidance apparatus comprises a wire guidance system for conveying a plurality of electrical guidance signals via wires embedded in the factory floor below the path over which the vehicle travels.

4. A system as recited in claim 3, wherein the unique radio frequency signals from said radio frequency tags identify one of the plurality of electrical guidance signals received by said sensor for use by said information processor as the predetermined action for navigating the vehicle through the factory floor.

5. A system as recited in claim 2, wherein said radio frequency tags convey the unique radio frequency signals in a sufficient number of states or values to convey information sufficient to identify the characteristic area condition related to the path of the vehicle.

6. A system as recited in claim 5, wherein said radio frequency tags convey the states or values of the unique radio frequency signals in the form of a multi-bit signal and said radio frequency tag reader decodes the multi-bit signal using said information processor to identify the characteristic area condition related to the path of the vehicle.

7. A system as recited in claim 6, wherein said radio frequency tags convey the states or values of the unique radio frequency signals in the form of American Standard Code for Information Interchange (ASCII) symbology.

8. A system as recited in claim 5, wherein one of the states of the unique radio frequency signals from said radio frequency tags identifies the characteristic area condition related to the path as directions to a destination for the vehicle.

9. A system as recited in claim 8, wherein one of the states of the unique radio frequency signals from said radio frequency tags identifies the characteristic area condition related to the path as directing the vehicle to change its course of direction as the predetermined action for navigating the vehicle through the area.

10. A system as recited in claim 5, wherein one of the states of the unique radio frequency signals from said radio frequency tags identifies the characteristic area condition related to the path as directing the vehicle for picking-up or dropping-off a load of materials in transit.

11. A system as recited in claim 5, wherein one of the states of the unique radio frequency signals from said radio frequency tags identifies the characteristic area condition related to the path as an intersection being approached or cleared by the vehicle to facilitate safe navigation through the intersection.

12. A system as recited in claim 2, wherein said radio frequency tag reader of said controller includes said electromagnetic field generator, said tag reader and said generator combination providing radio frequency identification (RFID) mounted on the vehicle for positioning in the vicinity of said radio frequency tags as the vehicle travels thereover for identifying the characteristic area condition.

13. A system as recited in claim 2, wherein said communications transceiver comprises a radio frequency modem coupled to said information processor.

14. A system as recited in claim 2, wherein the unique radio frequency signals from said radio frequency tags identify the characteristic area condition related to the path as an intersection being approached or cleared by the vehicle, and wherein said transceiver broadcasts a vehicle-crossing message to the other vehicles indicating that the intersection is in use to facilitate safe navigation through the intersection.

15. A system as recited in claim 14, wherein said transceiver broadcasts the vehicle-crossing message for the duration that the intersection is in use.

16. A system as recited in claim 14, wherein said controller, responsive to said radio frequency tags identifying that an intersection is being approached, uses said transceiver for receiving vehicle-crossing message broadcasts from the other vehicles to facilitate safe navigation through the intersection.

17. A method of navigating an automatic guided vehicle through a congested area, comprising the steps of:

conveying a plurality of guidance signals for guiding the vehicle relative to the area along a path over which the vehicle travels;

providing a plurality of radio frequency tags, each of said radio frequency tags conveying at least one of a plurality of unique radio frequency signals in response to electromagnetic excitation fields;

positioning said radio frequency tags along the path over which the vehicle travels, each unique radio frequency signal of said radio frequency tags identifying a characteristic area condition related to the path of the vehicle;

generating electromagnetic excitation fields in the vicinity of one or more of said radio frequency tags;

receiving the plurality of guidance signals via said guidance apparatus using an information processor mounted on the vehicle;

identifying the unique radio frequency signals in response to the electromagnetic excitation fields using said information processor;

responding to at least one of the plurality of guidance signals and at least one characteristic area condition identified using said information processor for initiating a predetermined action for navigating the vehicle through the area; and broadcasting a message upon approaching an intersection, and no longer broadcasting said message after leaving the intersection.

18. A method as recited in claim 17, wherein the step of providing the plurality of radio frequency tags provides information for identifying the characteristic area condition related to the path as an intersection being approached or cleared by the vehicle to facilitate safe navigation through the intersection.

19. A method as recited in claim 17, wherein said area is a factory floor and the step of providing the plurality of radio frequency tags provides information for identifying one of the plurality of guidance signals for navigating the vehicle through the factory floor.

20. A system navigating an automatic guided vehicle through a congested area, comprising:

means for conveying a plurality of guidance signals for guiding the vehicle relative to the area along a path over which the vehicle travels;

means for providing a plurality of radio frequency tags, each of said radio frequency tags conveying at least one of a plurality of unique radio frequency signals in response to electromagnetic excitation fields;

means for positioning said radio frequency tags along the path over which the vehicle travels, each unique radio frequency signal of said radio frequency tags identifying a characteristic area condition related to the path of the vehicle;

means for generating electromagnetic excitation fields in the vicinity of one or more of said radio frequency tags;

means for receiving the plurality of guidance signals via said guidance apparatus using an information processor mounted on the vehicle;

means for identifying the unique radio frequency signals in response to the electromagnetic excitation fields using said information processor;

means for responding to at least one of the plurality of guidance signals and at least one characteristic area condition identified using said information processor for initiating a predetermined action for navigating the vehicle through the area; and means for broadcasting a message to other vehicles upon approaching an intersection, and no longer broadcasting said message after leaving the intersection.

21. A system as recited in claim 20, wherein said means for providing the plurality of radio frequency tags provides information for identifying the characteristic area condition related to the path as an intersection being approached or cleared by the vehicle to facilitate safe navigation through the intersection.

22. A system as recited in claim 20, wherein said area is a factory floor and said means for providing the plurality of radio frequency tags provides information for identifying one of the plurality of guidance signals for navigating the vehicle through the factory floor.

* * * * *